(12) United States Patent
Ma et al.

(10) Patent No.: US 9,881,590 B2
(45) Date of Patent: Jan. 30, 2018

(54) METHOD AND APPARATUS FOR MULTI-RESOLUTION POINT OF INTEREST BOUNDARY IDENTIFICATION IN DIGITAL MAP RENDERING

(71) Applicant: HERE Global B.V., Eindhoven (NL)

(72) Inventors: Xiang Ma, Chicago, IL (US); Qin Chen, Chicago, IL (US)

(73) Assignee: HERE Global, B.V., Eindhoven (NL)

( * ) Notice: Subject to any disclaimer, the term of this patent is extended or adjusted under 35 U.S.C. 154(b) by 135 days.

(21) Appl. No.: 14/206,503

(22) Filed: Mar. 12, 2014

(65) Prior Publication Data

US 2015/0261785 A1 Sep. 17, 2015

(51) Int. Cl.
| | | |
|---|---|---|
| G09G 5/377 | (2006.01) | |
| G01C 21/36 | (2006.01) | |
| G06T 11/60 | (2006.01) | |
| H04N 9/31 | (2006.01) | |
| G06F 3/14 | (2006.01) | |

(52) U.S. Cl.
CPC ......... *G09G 5/377* (2013.01); *G01C 21/3682* (2013.01); *G06F 3/1407* (2013.01); *G06T 2210/36* (2013.01); *G09G 2340/10* (2013.01); *G09G 2370/022* (2013.01)

(58) Field of Classification Search
CPC .......... G06T 2207/20212; G06T 11/60; G06T 3/4092; G06T 3/40; G09G 5/377; G09G 2340/145; G09G 5/391; G09G 2340/04; G09G 2340/0407; G09G 2340/04; H04N 9/3188; H04N 1/40068; H04N 1/400687; G06F 3/0481; G06F 3/04815; G06F 2207/025; G01C 21/3682

USPC ......... 345/629, 660, 633; 715/864; 701/461, 701/532
See application file for complete search history.

(56) References Cited

U.S. PATENT DOCUMENTS

| | | | | |
|---|---|---|---|---|
| 5,555,354 | A  * | 9/1996 | Strasnick | G06T 17/05 345/427 |
| 6,397,143 | B1 * | 5/2002 | Peschke | G01C 21/20 701/461 |
| 8,368,723 | B1 * | 2/2013 | Gossweiler, III | G06K 9/00261 345/428 |
| 8,928,657 | B2 * | 1/2015 | Bailiang | G06T 15/08 345/419 |
| 2003/0061211 | A1 * | 3/2003 | Shultz | G06F 17/3087 707/999.003 |
| 2012/0046861 | A1 * | 2/2012 | Feldbauer | G01C 21/3682 701/426 |
| 2013/0086517 | A1 * | 4/2013 | Van Lancker | G06F 3/04815 715/800 |

(Continued)

*Primary Examiner* — Chante Harrison
(74) *Attorney, Agent, or Firm* — Alston & Bird LLP

(57) ABSTRACT

A method, apparatus and computer program product are provided for multi-resolution point of interest boundary identification in digital map rendering. A method is provided for receiving a point of interest selection indication. The method also includes receiving point of interest boundary data and map data associated with the selected point of interest from a memory. The boundary data is based on the physical shape of the structure or region associated with the point of interest. The method also includes overlaying point of interest boundary data on the map data; and causing the map data with point of interest boundary data overlay to be displayed on a user interface.

17 Claims, 12 Drawing Sheets

(56) References Cited

U.S. PATENT DOCUMENTS

| | | | |
|---|---|---|---|
| 2013/0326425 A1* | 12/2013 | Forstall | G01C 21/3638 715/851 |
| 2014/0240350 A1* | 8/2014 | Chen et al. | 345/633 |
| 2015/0095350 A1* | 4/2015 | Chen et al. | 707/749 |
| 2015/0145865 A1* | 5/2015 | Barnett | G01C 21/367 345/428 |
| 2016/0054891 A1* | 2/2016 | Angelescu | G01C 21/3682 345/629 |

* cited by examiner

METHOD AND APPARATUS FOR MULTI-RESOLUTION POINT OF INTEREST BOUNDARY IDENTIFICATION IN DIGITAL MAP RENDERING

TECHNOLOGICAL FIELD

An example embodiment of the present invention to relates digital map rendering and, more particularly, to multi-resolution point of interest boundary identification in digital map rendering.

BACKGROUND

Current digital map rendering systems, such as standalone mobile navigation units, smart device mobile navigation applications, internet or database map programs, or the like, may place a pin or other location indicator at or near a point of interest (POI). However these location indicators can be misleading, e.g. fail to indicate the actual POI. For example, the location indicator may be rendered in a street near the POI, or in the middle of a building complex, on a building near the POI, on a building other than the POI, or the like. These misplaced or ambiguous location indicators may result in user confusion causing the user to fail to locate the POI or waste time finding the actual location of the POI.

BRIEF SUMMARY

A method, apparatus and computer program product are provided in accordance with an example embodiment in order to facilitate multi-resolution point of interest boundary identification in digital map rendering. In an example embodiment, a method is provided that includes receiving a point of interest selection indication. The method also includes receiving point of interest boundary data and map data associated with the selected point of interest from a memory. The point of interest boundary data is based on the physical shape of the structure or region associated with the point of interest. The method also includes overlaying point of interest boundary data on the map data; and causing the map data with point of interest boundary data overlay to be displayed on a user interface. In an example embodiment the method also includes generating a point of interest boundary data, based on the physical shape of a structure or region associated with the point of interest; associating the point of interest boundary data with point of interest context data and a map data location; and causing the point of interest boundary data to be stored in a memory.

In an example embodiment the method also includes receiving a point of interest query indication; and generating a point of interest query response list. The method of an example embodiment also includes performing a map resolution analysis with the overlaying of the point of interest boundary data on the map data being based on the map resolution analysis. An example embodiment of this method includes receiving a resolution change indication with the resolution analysis being further based on the resolution change indication. In an example embodiment the method also includes highlighting the point of interest boundary data overlaid on the map data. In an example embodiment of the method the point of interest boundary data comprises entrance data.

In an example embodiment an apparatus is provided including at least one processor and at least one memory including computer program code with at least one memory and computer program code configured to, with the processor, cause the apparatus to at least: receive a point of interest selection indication and receive point of interest boundary data and map data associated with the selected point of interest from a memory. The point of interest boundary data is based on the physical shape of the structure or region associated with the point of interest. The at least one memory and computer program code are also configured to, with the processor, cause the apparatus to overlay point of interest boundary data on the map data; and cause the map data with point of interest boundary data overlay to be displayed on a user interface.

The at least one memory and the computer program code may be further configured to, with the processor, cause the apparatus of the example embodiment to generate a point of interest boundary data, based on the physical shape of a structure or region associated with the point of interest; associate the point of interest boundary data with point of interest context data and a map data location; and cause the point of interest boundary data to be stored in a memory. The at least one memory and the computer program code may be further configured to, with the processor, cause the apparatus of the example embodiment to receive a point of interest query indication; and generate a point of interest query response list.

The at least one memory and the computer program code may be further configured to, with the processor, cause the apparatus of the example embodiment to perform a map resolution analysis with the overlaying of the point of interest boundary data on the map data being based on the map resolution analysis. The at least one memory and the computer program code may be further configured to, with the processor, cause the apparatus of the example embodiment to receive a resolution change indication with the resolution analysis being further based on the resolution change indication.

The at least one memory and the computer program code may be further configured to, with the processor, cause the apparatus of the example embodiment to highlight the point of interest boundary data overlaid on the map data. In an example embodiment of the apparatus, the point of interest boundary data comprises entrance data.

In an example embodiment a computer program product is provided including at least one non-transitory computer-readable storage medium having computer-executable program portions stored therein with the computer-executable program portions including program code instructions configured to receive a point of interest selection indication and to receive point of interest boundary data and map data associated with the selected point of interest from a memory. The point of interest boundary data is based on the physical shape of the structure or region associated with the point of interest. The computer executable program portions also include instructions configured to overlay point of interest boundary data on the map data; and cause the map data with point of interest boundary data overlay to be displayed on a user interface.

The computer-executable program code portions of an example embodiment of the computer program product may also include program code instructions configured to generate a point of interest boundary data, based on the physical shape of a structure or region associated with the point of interest; associate the point of interest boundary data with point of interest context data and a map data location; and cause the point of interest boundary data to be stored in a memory. The computer-executable program code portions of an example embodiment of the computer program product may also include program code instructions configured to receive a point of interest query indication; and generate a point of interest query response list.

The computer-executable program code portions of an example embodiment of the computer program product may also include program code instructions configured to perform a map resolution analysis with the overlaying of the point of interest boundary data on the map data being based on the map resolution analysis. The computer-executable program code portions of an example embodiment of the computer program product may also include program code instructions configured to receive a resolution change indication with the resolution analysis being further based on the resolution change indication. The computer-executable program code portions of an example embodiment of the computer program product may also include program code instructions configured to highlight the point of interest boundary data overlaid on the map data.

In yet another example embodiment, an apparatus is provided that includes means for receiving a point of interest selection indication and means for receiving point of interest boundary data and map data associated with the selected point of interest from a memory. The point of interest boundary data is based on the physical shape of the structure or region associated with the point of interest; means for overlaying point of interest boundary data on the map data. The apparatus of this embodiment also includes means for causing the map data with point of interest boundary data overlay to be displayed on a user interface.

BRIEF DESCRIPTION OF THE DRAWINGS

Figure 1:
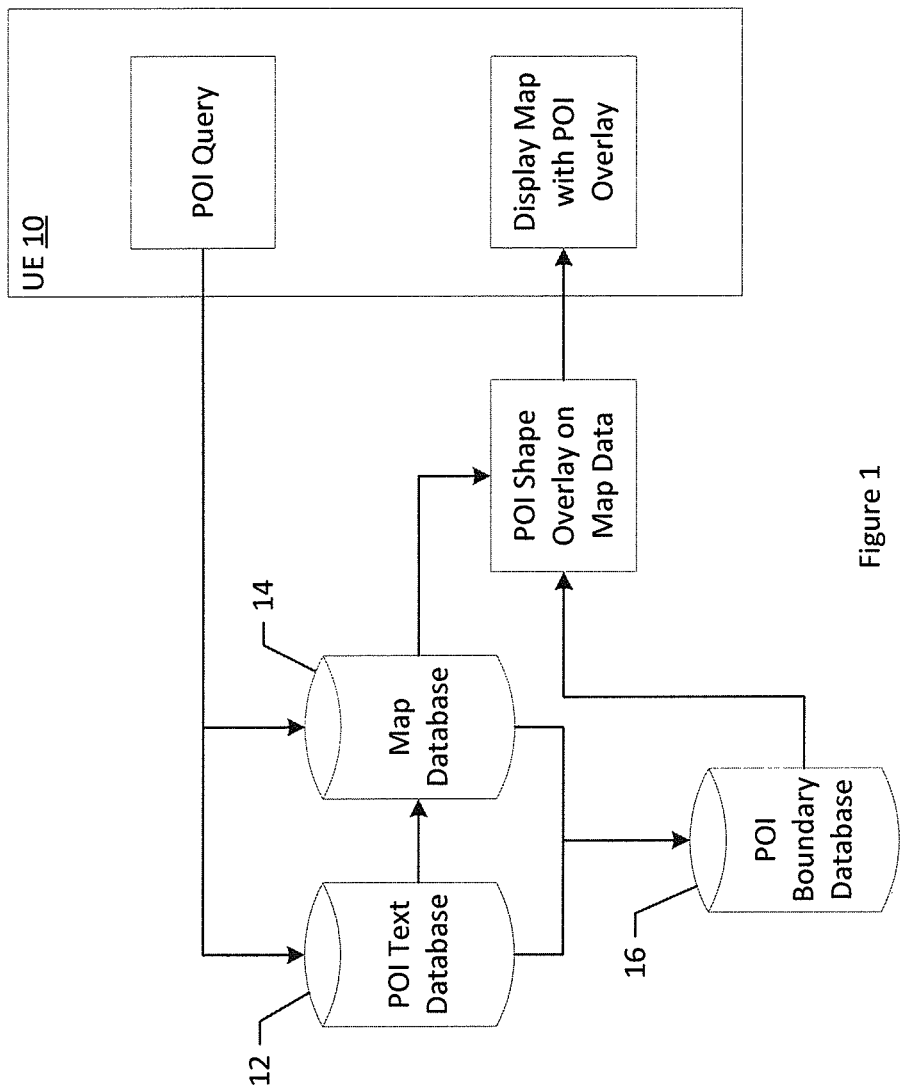
Figure 2:
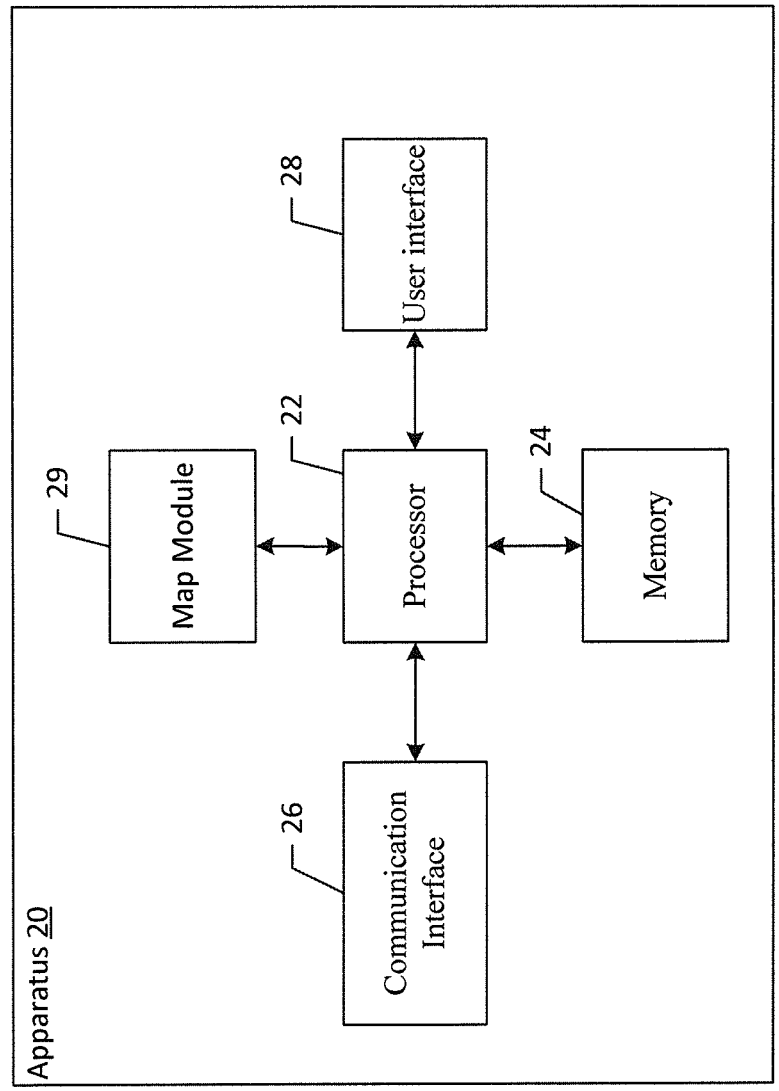
Figure 3:
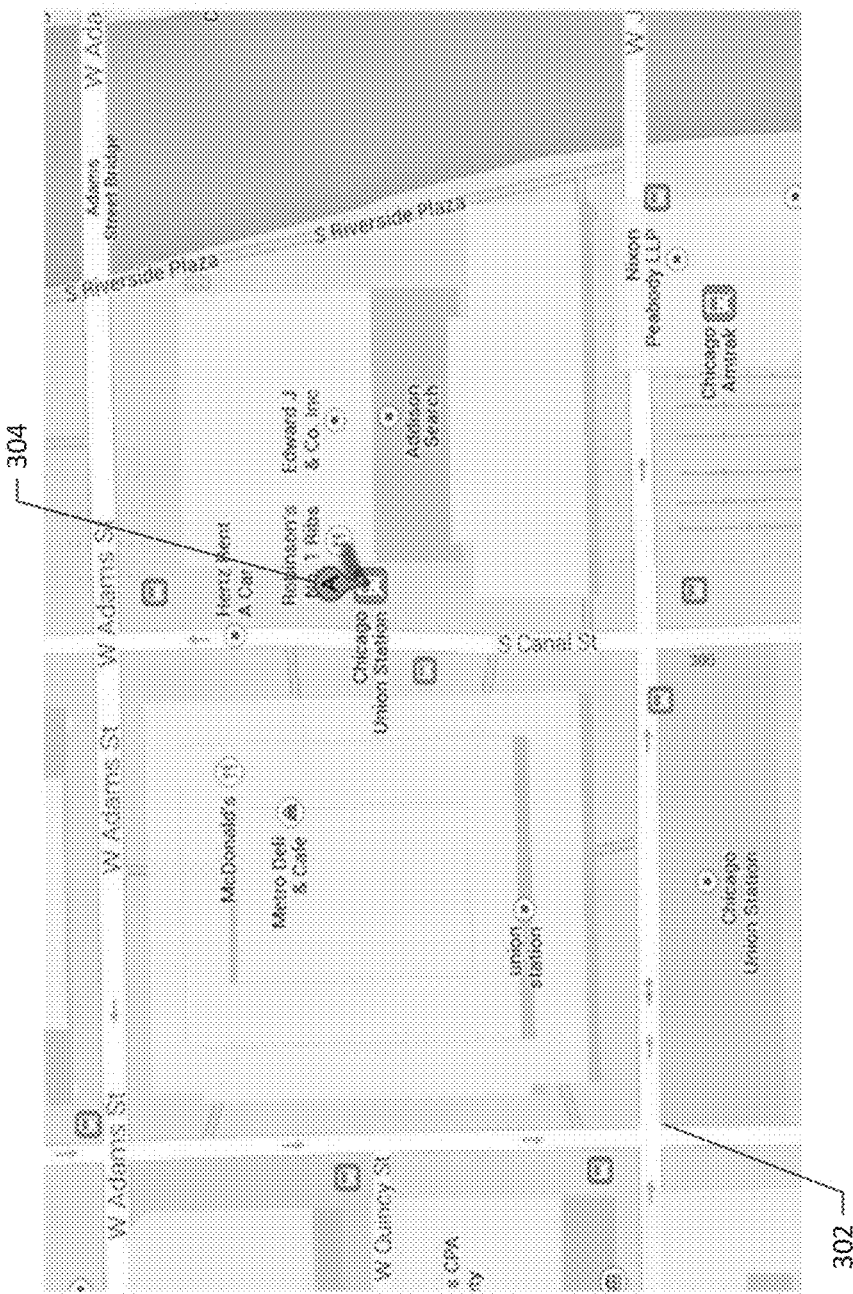
Figure 4:
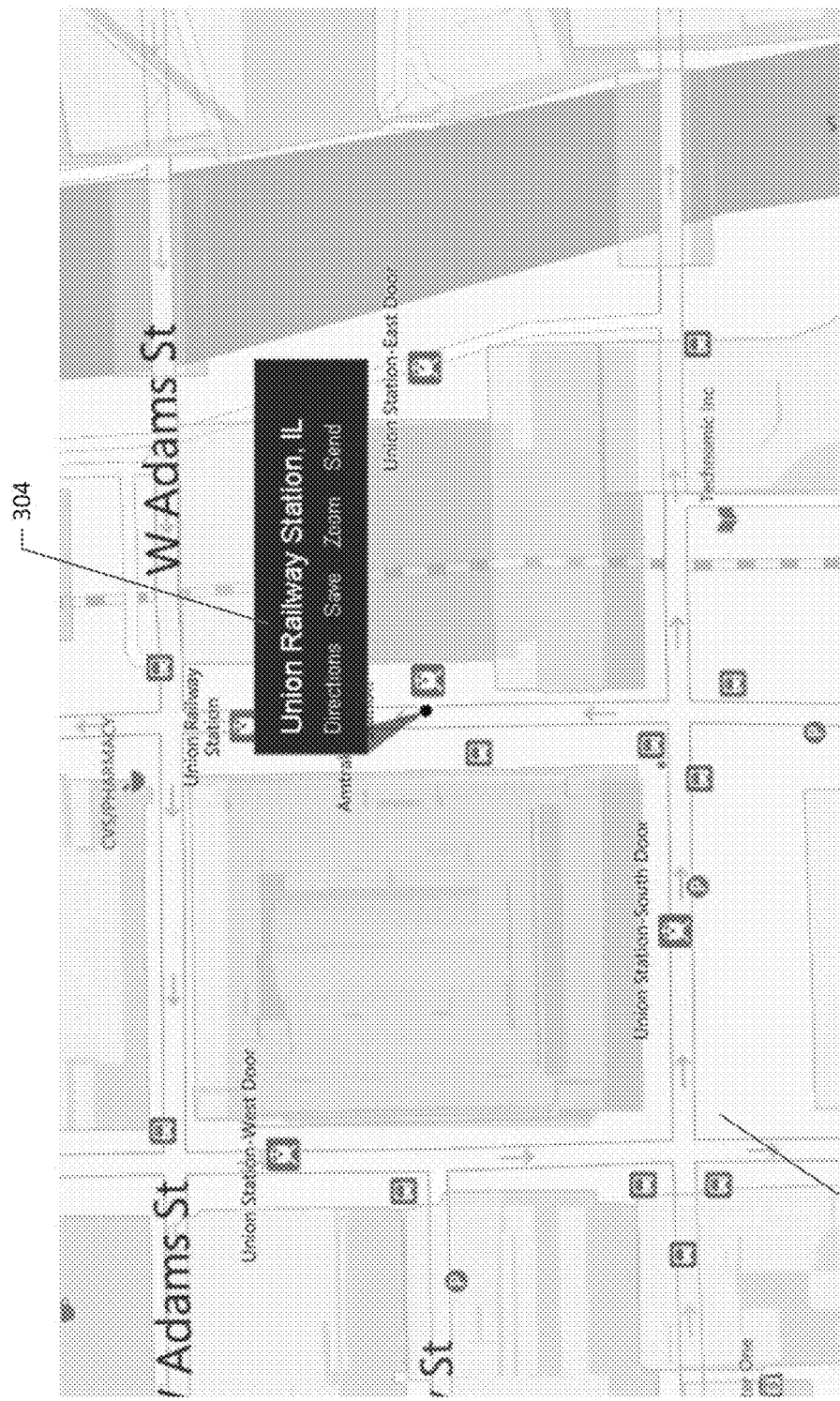
Figure 5:
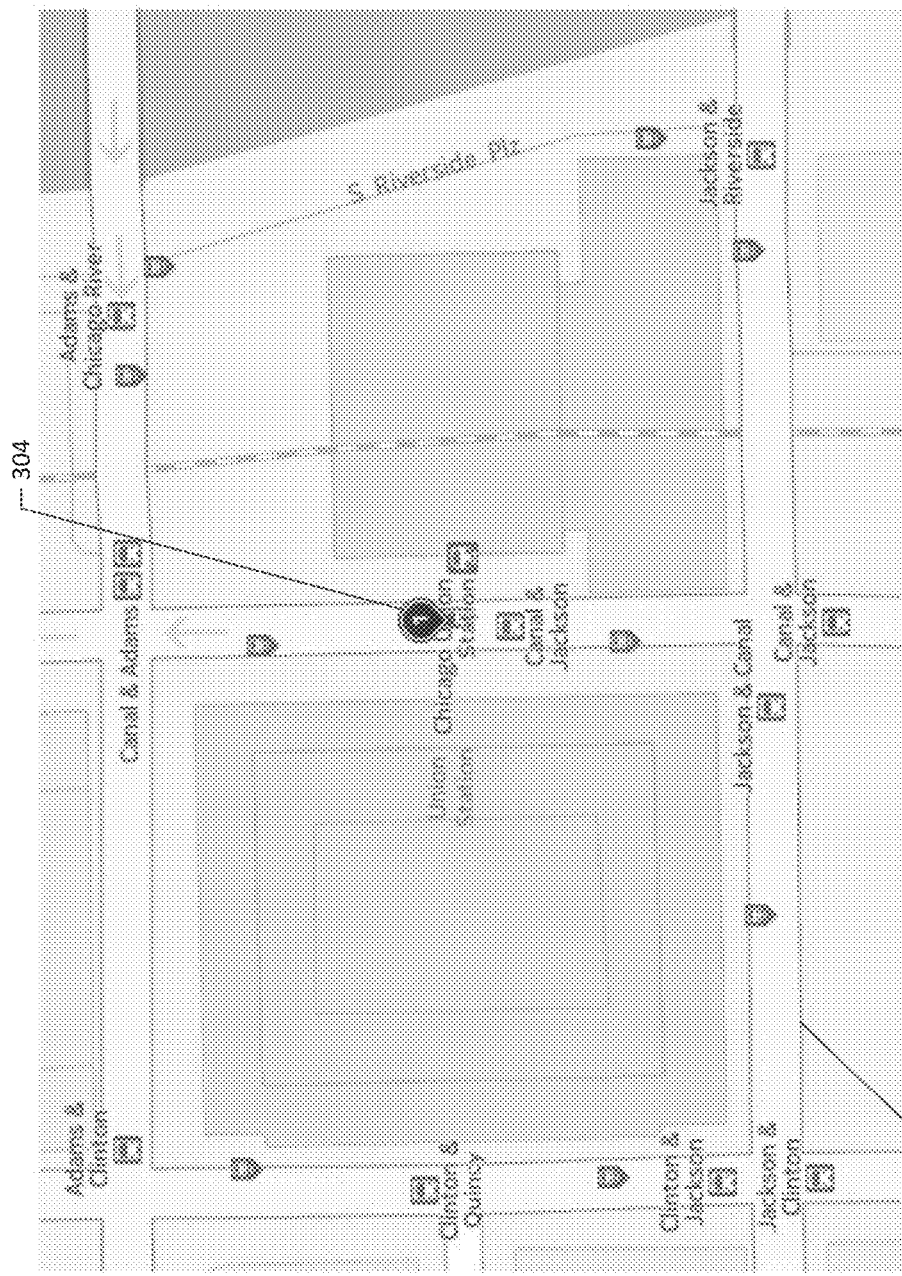
Figure 9:
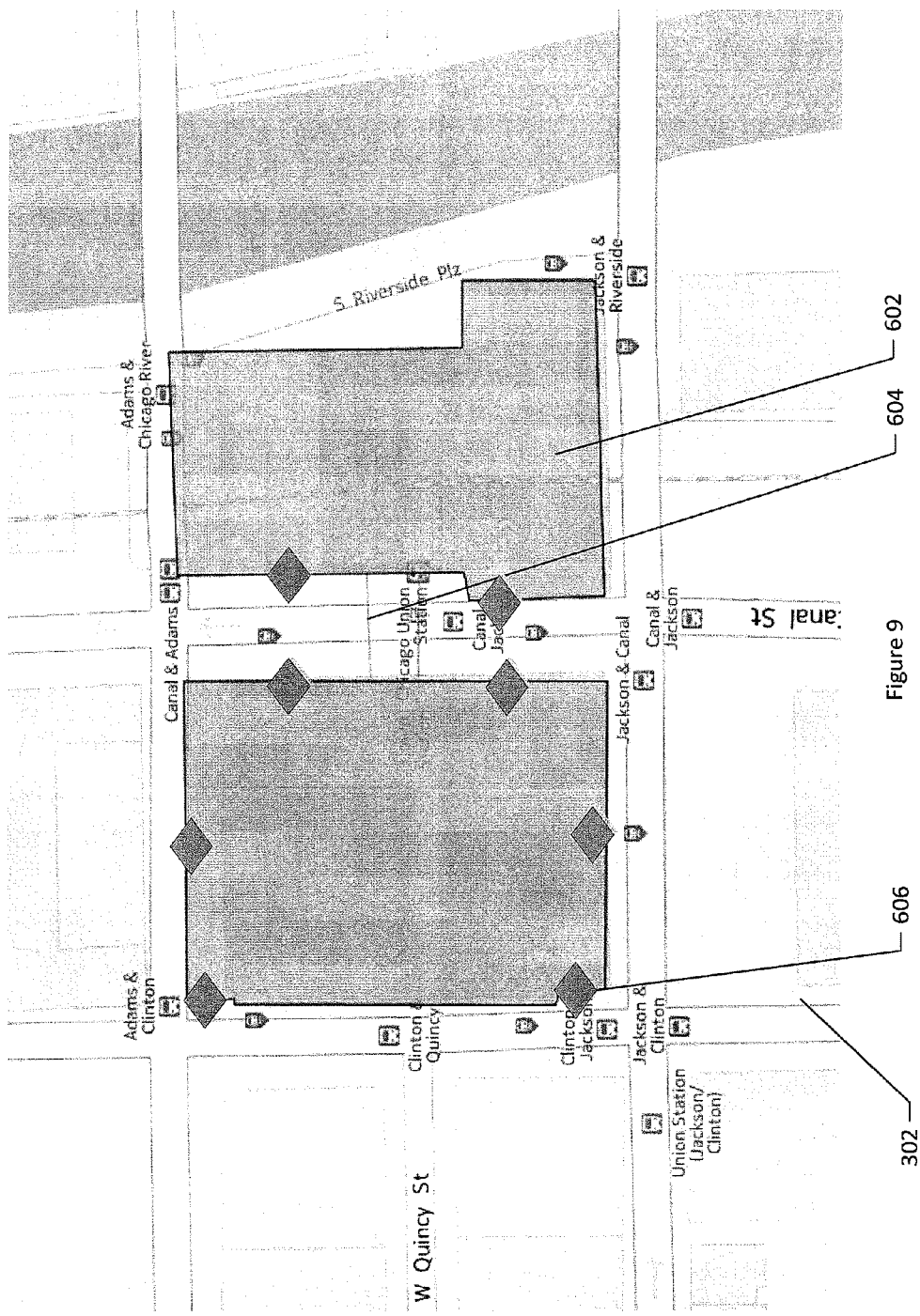
Figure 10:
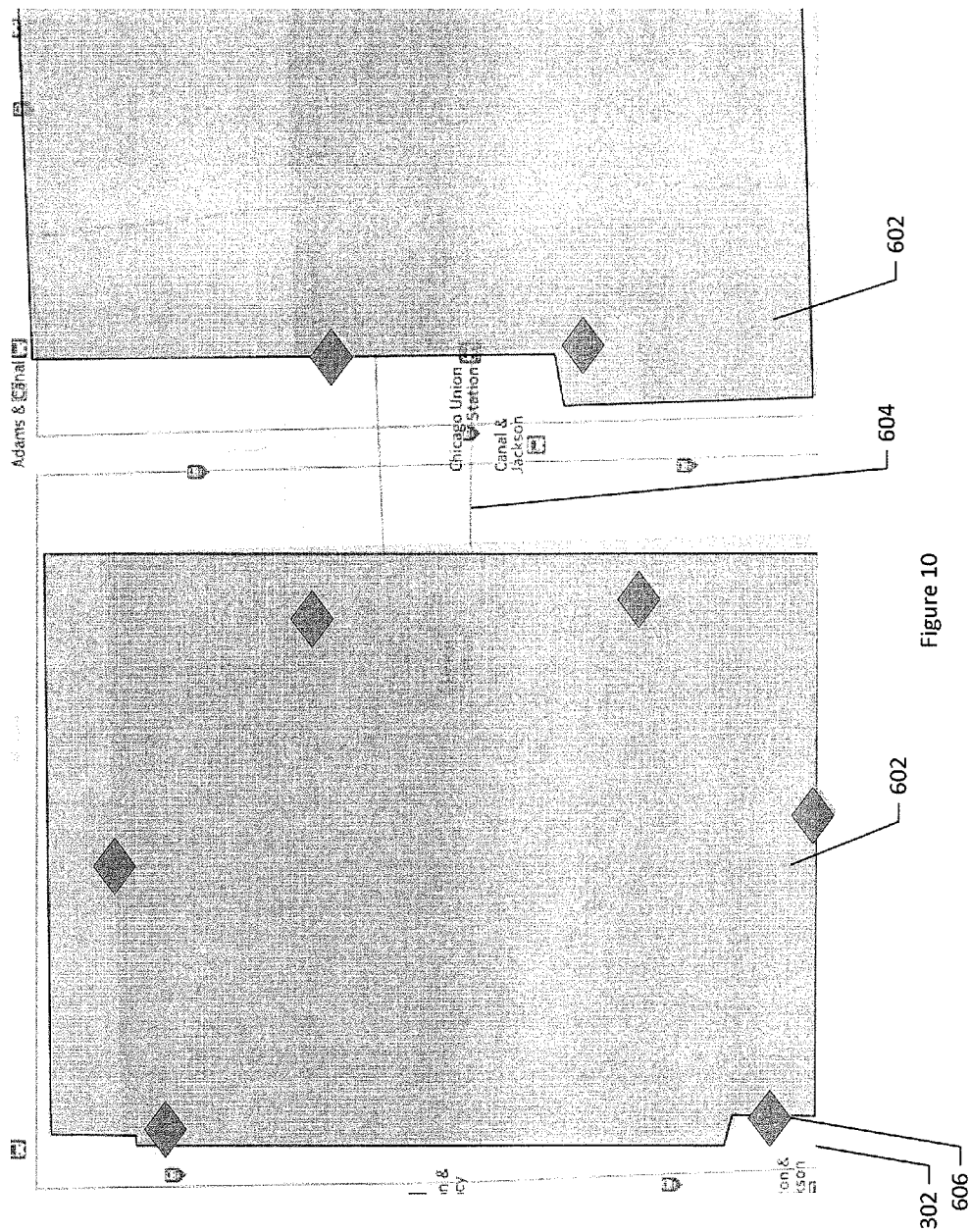
Figure 11:
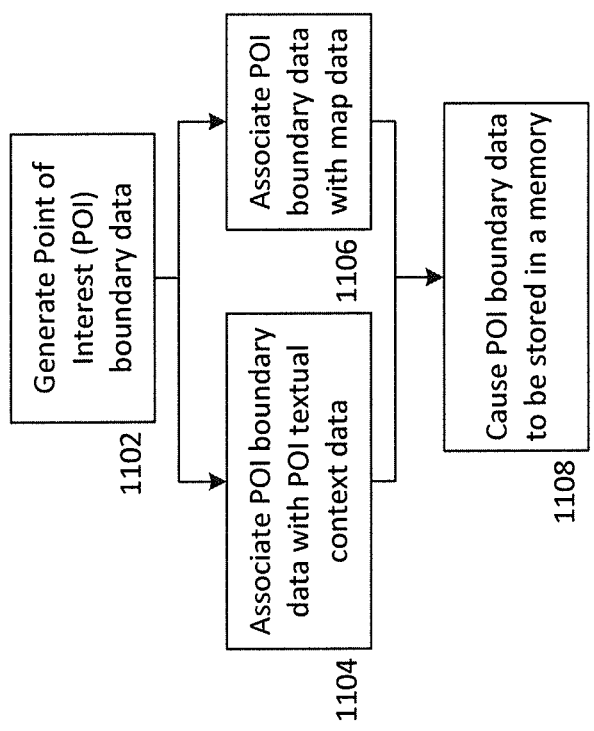
Figure 12:
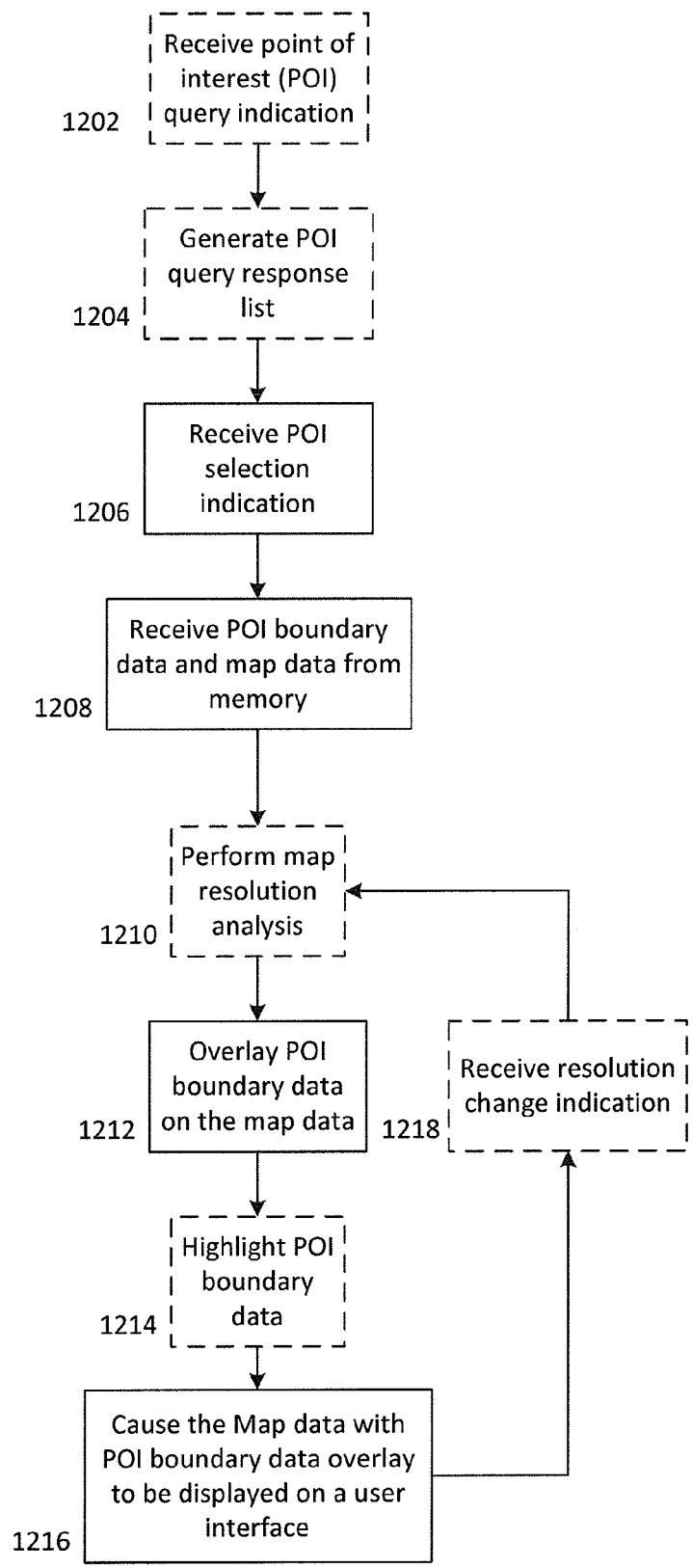

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for multi-resolution point of interest boundary identification in digital map rendering in accordance with an example embodiment of the present invention;

FIGS. 3-5 illustrate example prior art point of interest map renderings;

FIGS. 6-10 illustrate example point of interest map renderings in accordance with an example embodiment of the present invention; and FIGS. 11 and 12 are flow charts illustrating the operations performed, such as by the apparatus of FIG. 2, in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment for multi-resolution point of interest boundary identification in digital map rendering.

FIG. 1 illustrates a communication diagram including a user equipment (UE) 10, POI text database 12, a map database 14, and a POI boundary database 16. The databases 12-16 may be a portion of the UE 10, such as a memory, remote databases such as associated with network servers, or other information storage system. A point of interest (POI) may include buildings, structures, geographical location, or the like.

The POI text database 12 may include text based context data associated with the POI. Text based context data may include without limitation the proper name of a POI (e.g. O'Hare International Airport, Chicago Union Station, or the like), a common name for a POI (e.g. Chicago airport, O'Hare Airport, O'Hare Airfield, Union Station, or the like), an abbreviation for a POI (e.g. ORD), business associated with the POI (e.g. Delta®, American Airlines®, Amtrak®, or the like), person associated with the POI (e.g. location of Ronald Reagan's childhood home), event associated with POI (e.g. location of the battle of Hoke's Run, Jimmy Buffett concert, or the like), street address for the POI (e.g. 10000 West O'Hare Ave, Chicago, Ill. 60666), or the like.

The map database 14 may include map data for a geographical area. The map data may include POI location data, topographical data, transportation data (e.g. streets, highways, railroads, or the like), aerial image overlay data (e.g. satellite image associated with the location), terrain data (e.g. metropolis, forest, lake, river, field, or the like), or the like. The POI location data may be associated with POI textual context data.

The POI boundary database 16 may store boundary data for POIs that define the geographical boundaries for the POI. The POI boundary data may include, without limitation a polygon line boundaries (e.g. physical shape of a structure or region associated with the POI), entrance/exit data for buildings and structures, two or three dimensional representations of a POI (e.g. building, structure, park or the like), over street walkways, underpasses, tunnels or the like. The POI boundary data may be generated using surveys, areal image analysis, aerial lidar analysis, ground perspective image analysis, ground lidar analysis, laser scanning or the like. The POI boundary data is then stored in the POI boundary database.

The POI boundary data may be associated with the POI location data of the map data. The POI boundary data may also be associated with the POI textual context data. For example, the textual information for Chicago Union Station may be associated with the geographical location of the map data and the geographical shape, e.g. boundary data of the Chicago Union Station building.

The UE 10 may be a mobile device, such as a smart phone, laptop computer, tablet computer, personal data assistant (PDA), a mobile navigation unit (e.g. global positioning system (GPS)), or the like, or a stationary device, such as an information kiosk or desktop computer, configured with a map rendering or navigation program or an internet application configured for map rendering, or the like.

A user may enter a POI query using the user interface of the UE 10. For example, the user may enter a POI query "Union station." The UE 10 may search the POI text data base for contextual data matching the POI query indication. In some embodiments the UE 10 may translate misspelled or abbreviated names (e.g. unin station, Union stat., or the like) to a recognized query criteria.

The UE 10 may receive a POI query response list from the POI textual context database 14. The POI query response list may include POI names that are a match or partial match to the POI query indication. The user may select a POI from the POI query response list using a user interface. For example, if the POI query indication included "union station," the query response list may include Chicago Union station, St. Louis Union station, Union street bus station, or the like. The user may select Chicago union station from the POI response list, using the user interface.

Additionally or alternatively, the UE 10 receiving the POI query response list may automatically, without user interaction, select a POI from the POI query response list. For example, the POI query indication may include "Union station" and the UE 10 may identify and select the closest union station or highest relevance union station from the available matches or partial matches to the query request indication.

The UE 10 may receive POI boundary data and map data associated with the selected POI from the POI boundary database 16 and the map database 14 respectively. The UE 10 may request the POI boundary data from the boundary database 16 using the selected POI indication context data. The UE 10 may request the map data from the map database 14 using the selected POI indication context data. The boundary database 16 and map database 14 may send the POI boundary data and map data to the UE 10.

The UE 10 may perform a map resolution analysis based on the POI boundary data, a current location data, map data, user interface size, or like with the resolution increasing and decreasing with the size of the interface, or size of the depicted area. The UE 10 may determine the appropriate resolution to display the map data based on the POI boundary data, current location, map data, user interface size, or the like. For example, the resolution may be lower when the distance between current location and the POI location is large, or the size of the user interface is small, allowing a larger area of map data to be displayed. A higher resolution may be used if the size of the user interface is large, the POI boundary data is small, the distance between the current location and the POI is short, or the like. The UE 10 may match or otherwise associate the resolution of the map data and the POI boundary data.

The UE 10 may also determine which details to render of the map data, and POI boundary data based on the resolution with the level of detail increasing and decreasing with the resolution. For example, if the map rendering area is determined with a 300 meters per pixel, the rendered map data may include major transportation channels (e.g. highways, train lines, or the like) and important landmarks (Sears tower, Navy Pier, or the like), and not render, streets, businesses, or the like. The POI boundary data may include less detailed boundary shape at lower resolutions, (e.g. a square in the POI location). As the resolution increases, for example 10 meters per pixel, the rendering may include more map data details, (e.g. bus stops, streets, businesses, or the like) and POI boundary data details, (e.g. depressions and protrusions of the actual boundary shape of the POI, entrance/exit data, over street walk ways, underpasses, tunnels, or the like).

The UE 10 may overlay the POI boundary data on the map data. The POI boundary data may be overlaid on the location associated with the POI. For example, in an instance in which POI boundary data is associated with the Chicago Union Station, the POI boundary data may be overlaid on the map data based on the location data of the Chicago Union Station.

The UE 10 may highlight the POI boundary data overlaid on the map data. The POI boundary data may be rendered in a different or brighter color than surrounding map data, the boundary may be filled with a solid or translucent color to indicate the highlighted area, or other method of highlighting the POI boundary data.

The UE 10 may cause the map data with POI overlay to be displayed on a user interface. The user may view and/or manipulate the map data with POI overlay rendering, e.g. move the viewable area of the map to the right or left, zoom in or out, or the like. In an instance in which the user zooms in or out on the map data with POI overlay rendering, the UE may receive a resolution change indication.

The UE 10 may perform or re-preform the map resolution analysis, as discussed above, based on the resolution change indication. For example, if the resolution increased more POI boundary data and map data details may be rendered. Conversely, if the resolution decreased, less POI boundary data and map data details may be rendered.

Example Apparatus

A UE 10 may include or otherwise be associated with an apparatus 200 as shown in FIG. 2. The apparatus, such as that shown in FIG. 2, is specifically configured in accordance with an example embodiment of the present invention to provide for displaying map data with overlaid point of interest boundary data. The apparatus may include or otherwise be in communication with a processor 22, a memory device 24, a communication interface 26, a user interface 28, and a map module 29. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by UE 10. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include a communication interface 26 that may be any means such as a device or circuitry embodied in either hardware or a combination of hardware and software that is configured to receive and/or transmit data from/to a communications device in communication with the apparatus, such as to facilitate communications with one or more user equipment 10 or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 20 may also include a user interface 28 that may, in turn, be in communication with the processor 22 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (e.g., software and/or firmware) stored on a memory accessible to the processor (e.g., memory device 24, and/or the like).

The apparatus may also include a map module 29, which may be a processor, memory or the like, which may in turn be in communication with the processor 22, and configured to cause the processor 22 or communications interface 26 to receive a POI selection indication; receive a POI boundary data and map data associated with the selected POI from a memory, such as memory 24, overlay POI boundary data on the map data; and cause the map data with the POI overlay to be displayed on a user interface, such as user interface 28. In an example embodiment. The map module 29 may be configured to cause the processor 22 to generate POI boundary data based on the physical shape of a structure or region associated with the point of interest; associate the POI boundary data with point of interest context data and map data location; and cause the POI boundary data to be stored in a memory.

The map module 29 may be further configured to cause the processor 22 to receive a point of interest query indication and generate a point of interest query response list. In further example embodiments, the map module 29 may be configured to cause the processor 22 to perform a map resolution analysis. The overlaying of the POI boundary data may be based on the map resolution analysis. The map module 29 may be further configured to cause the processor 22 and the communication interface 26 to receive a resolution change indication. The resolution analysis is further based on the resolution change indication. In a further example embodiment, the map module 29 may be configured to cause the processor to highlight the POI boundary data overlaid on the map data.

Example Map Data Renderings with POI Indications

FIGS. 3-5 illustrate example map data renderings with POI indications found in the prior art. The map renderings include map data 320 and a POI indication 304. In FIG. 3, the POI indication 304 for Chicago Union Station is a pin overlaid on the map data 302. The POI indication 302 pin is located outside of the Union Station concourse building, between the Union station concourse building and the mezzanine building.

In FIG. 4, the POI indicator 304 is a dot with a breakout title box overlaid on the map data 302. The POI indicator dot is located in the street between the Union Station Concourse building and mezzanine building.

In FIG. 5, the POI indicator 304 is a pin overlaid on the map data 302. The POI indicator 302 pin is located in the street between the Union Station concourse building and the Union Station mezzanine building.

The POI indicator 304 in FIGS. 3-5 is positioned in locations near the POI they are indicating. The POI indicators fail to identify the buildings or entryways associated with the POI. The user may travel to the POI indicator and then must search for the building in which the POI is located. Further, after identifying the building associated with the POI the user may have to locate the entrance, which could be irksome in instances in which the building is large or has a single entrance.

Example Map Data Rendering with POI Boundary Data Overlay

Figure 6:
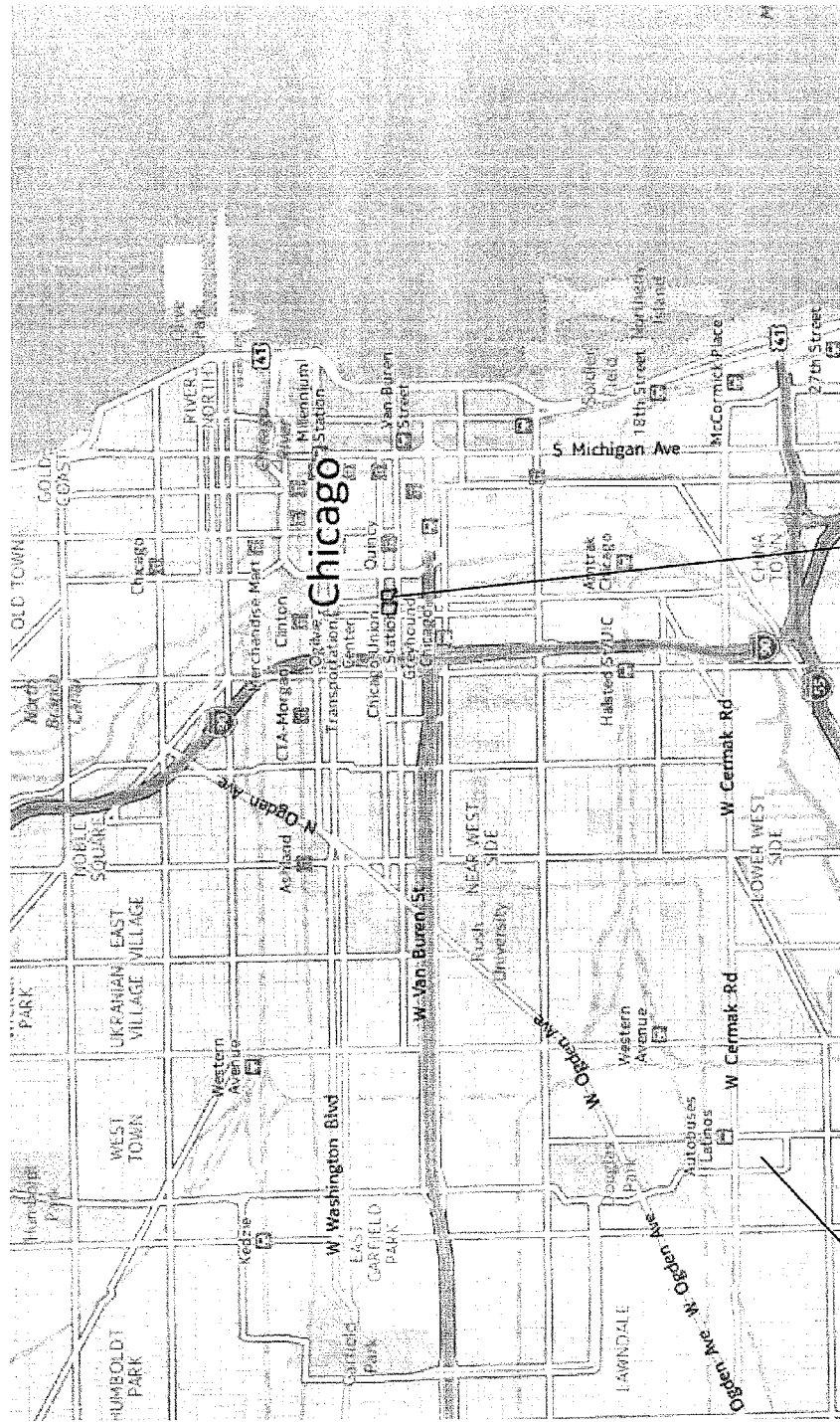

FIGS. 6-10 illustrate map data rendering with POI boundary data overlay in various resolutions. FIG. 6 illustrates map data 302 rendering with POI boundary data overlay 602 at a relatively low resolution. The POI boundary data 602 in this example is represented by two sets of polygonal lines depicting the physical shape of Chicago Union Station Mezzanine building and concourse building. The POI boundary data polygonal lines are highlighted in a color different from and illustrating the distinct area of the POI. The POI boundary data 602 also cause a distinct color to fill the polygonal lines. The shape of the POI boundary data 602 polygonal lines may be a generic shape such as a square at low resolution or be the POI structure or region shape rendered on the same resolution as the map data as shown in FIG. 6.

Figure 7:
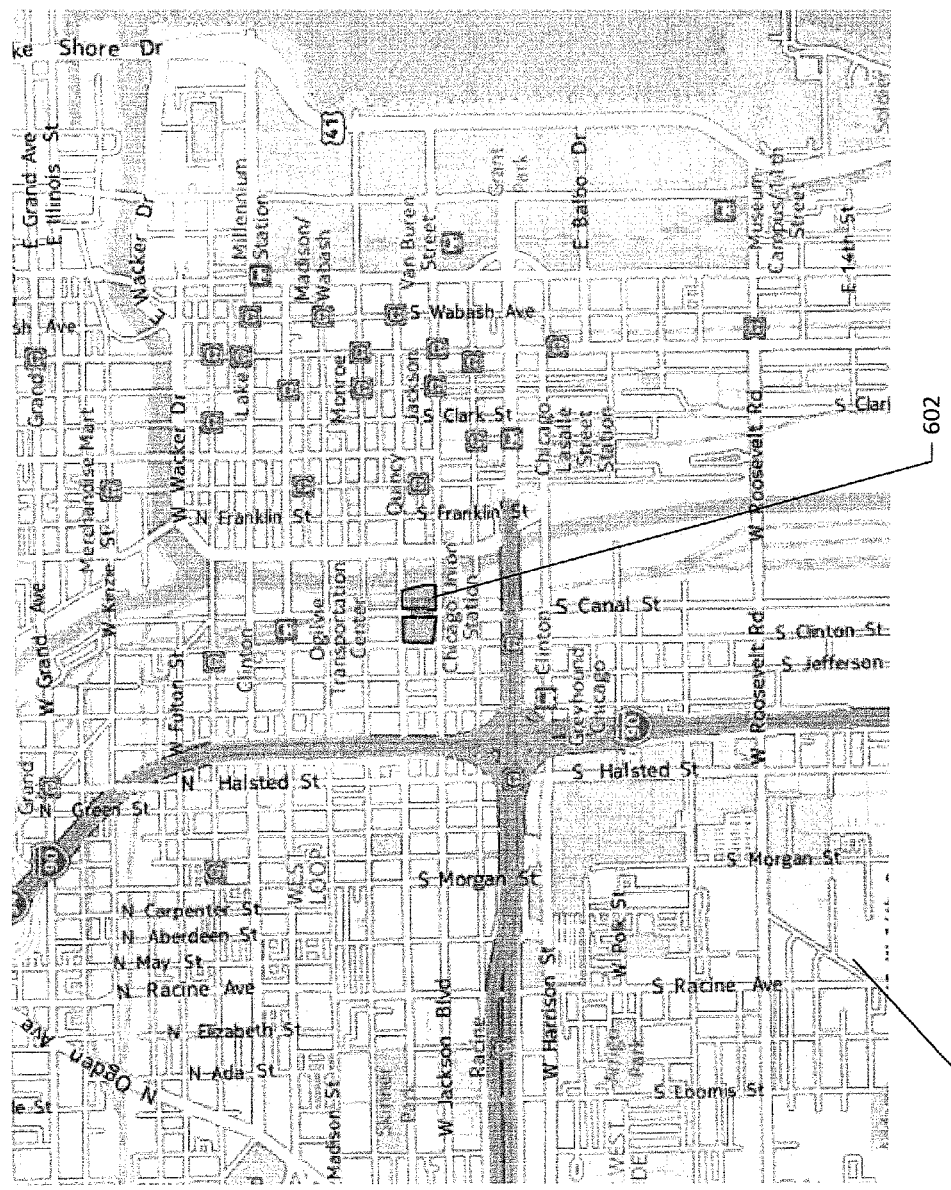

FIG. 7 illustrates map data 302 rendering with a boundary data 602 overlay at a higher resolution than FIG. 6. The map data 302 with POI boundary data 602 overlay rendering has further detail. For example, more streets are indicated on the map data 302 and the polygonal lines are more distinctly shaped in the POI boundary data 602 than FIG. 6.

Figure 8:
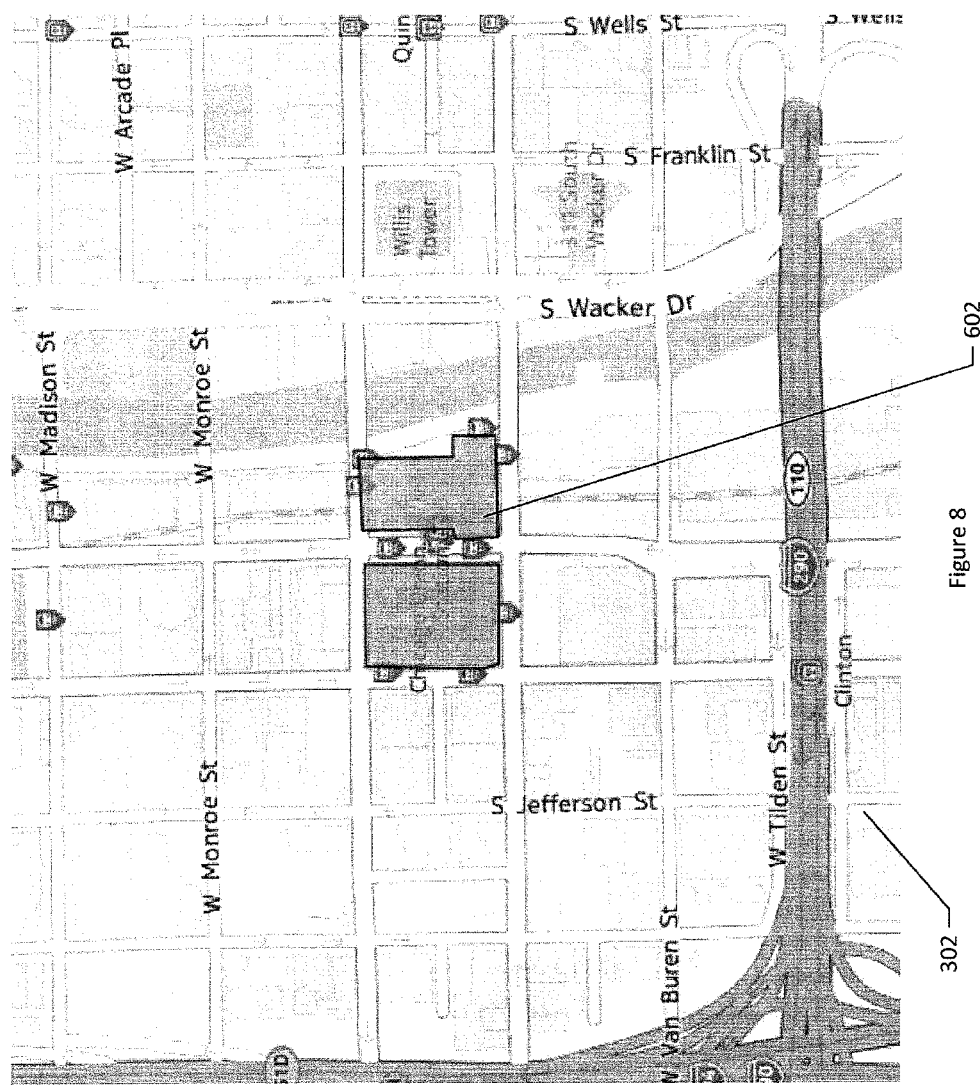

FIG. 8 illustrates a map data 302 rendering with a boundary data overlay at a higher resolution than FIGS. 6 and 7. The map data 302 with POI boundary data 602 overlay rendering has further detail. For example, the traffic direction is indicated in the map data 302 and the polygonal lines of the POI boundary data 602 have a further defined shape.

FIG. 9 illustrates a map data 302 rendering with a boundary data 602 overlay at a higher resolution than FIGS. 6-8. The POI boundary data 602 provides further detail at this higher resolution including an over street walkway 604 between the Union Station Mezzanine building and the Concourse building and entrances 606 to the union station buildings.

FIG. 10 illustrates a map data 302 rendering with POI boundary data 602 overlay at a higher resolution than FIGS. 6-9. The POI boundary data 602 provides still further details by moving the location of the entrances 606 from the polygonal lines to within the boundary area to more specifically identify the location of the entrances.

Example Process for Generating POI Boundary Data

Referring now to FIG. 11, the operations performed, such as by the apparatus 20 of FIG. 2, for generating POI boundary data are illustrated. As shown in block 1102 of FIG. 11, the apparatus may include means, such as the map module 29, processor 22, or the like, configured to generate POI boundary data. The map module 29 may cause the processor 22 to generate POI boundary data based on surveys, aerial images, street level images, or the like. The POI boundary information may include, without limitation, a polygon line boundaries (e.g. physical shape of a structure or region associated with the POI), entrance/exit data for buildings and structures, two or three dimensional representations of POI (e.g. building, structure, park, or the like), over street walkways, underpasses, tunnels, or the like.

As shown in block 1104 of FIG. 11, the apparatus 20 may include means, such as a map module 29, processor 22, or the like, configured to associate the POI boundary data with the POI textual context data. For example, the processor 22 may associate the textual data associated with Chicago Union station to the boundary data associated with Chicago Union Station.

As shown in block 1106 of FIG. 11, the apparatus 20 may include means, such as a map module 29, a processor 22, or the like, configured to associate the POI boundary data with the POI location data of the map data. For example, the processor may associate the geographical location of the POI on the map data with the geographical shape of the POI and/or other boundary data (e.g. entrance/exit data, region shape, over street walkways, underpasses, tunnel, or the like).

As shown in block 1108 of FIG. 11, the apparatus 20 may include means, such as a map module 29, processor 22, memory 24, or the like, configured to cause the POI boundary data to be stored in a memory 24. The processor 22 may cause the POI boundary data to be stored in a memory 24, such as the POI boundary database 16.

Example Process for Displaying Map Data with Overlaid POI Boundary Data

Referring now to FIG. 12, the operations performed, such as by the apparatus 20 of FIG. 2, for displaying map data with overlaid POI boundary data are illustrated. As shown in block 1202 of FIG. 12, the apparatus may include means, such as the map module 29, processor 22, user interface 28 or the like, configured to receive a POI query indication. The user may enter a POI query indication using the user interface 26. For example, the user may enter a POI query "Union station." The UE 10 may search the POI text data base for contextual data matching the POI query indication. In some embodiments the UE 10 may translate misspelled or abbreviated names (e.g. unin station, Union stat., or the like) to a recognized query criteria.

As shown in block 1204 of FIG. 12, the apparatus 20 may include a means, such as a map module 29, a processor 22, a communications module 26, or the like, configured to generate a POI query response list. The processor 22 may access a memory 24, such as the POI textual context database, and search for matches and partial matches between the stored POI textual context data and the POI query indication. The processor 22 may compile the matches and partial matches into a POI query response list.

As shown at block 1206, of FIG. 12, the apparatus 20 may include means, such as a map module 29, a processor 22, a user interface 28, or the like, configured to receive a POI selection indication. The POI query response list may be displayed on a user interface 28. The user may select a POI from the displayed POI query response list using the user interface 28. The processor 22 may receive the POI selection indication from the user interface 28.

Additionally or alternatively, the processor 22 may select the POI from the POI query response list automatically, without user input. The processor 22 may select a POI based on proximity to the current location of the apparatus 20, popularity, relevance, or the like.

As shown at block 1208 of FIG. 12, the apparatus 20 may include means, such as a map module 29, a processor 22, a communications module 26, a memory 24, or the like, configured to receive POI boundary data and map data from a memory 24. The processor 22 may access a local or remote memory 24, such as the map database 14 and POI boundary database. The processor 22 may receive the map data and POI boundary data associated with the POI textual context data, from the map database 14 and POI boundary database, respectively. For example, the map data associated with Chicago and the boundary data associated with the Chicago Union Station may be received as the data associated with POI textual context data "Chicago Union Station."

As shown at block 1210 of FIG. 12, the apparatus 20 may include means, such as a map module 29, a processor 22, or the like, configured to perform map resolution analysis. The processor 22 may determine the appropriate resolution to display the map data based on the POI boundary data, current location, map data, user interface size, or the like with the resolution increasing and decreasing with the size of the interface, or size of the depicted area. For example, the resolution may be lower when the distance between current location and the POI location is large, or the size of the user interface is small, allowing a larger area of map data to be displayed. A higher resolution may be used if the size of the user interface is large, the POI boundary data is small, the distance between the current location and the POI is short, or the like. The processor 22 may match the resolution of the map data to the resolution of the POI boundary data.

Additionally or alternatively, the processor 22 may determine which details to render of the map data, and POI boundary data based on the resolution with the level of detail increasing and decreasing with the resolution. For example, if the map rendering area is determined with a low resolution, such as 300 meters per pixel, the rendered map data may include major transportation channels (e.g. highways, train lines, or the like) and important landmarks (Sears tower, Navy Pier, or the like), and not render, streets, businesses, or the like. The POI boundary data may include less detailed boundary shape at lower resolutions, (e.g. a square in the POI location). As the resolution increases to, for example, 10 meters per pixel, the rendering may include more map data details, (e.g. bus stops, streets, businesses, or the like) and POI boundary data details, (e.g. depressions and protrusions of the actual boundary shape of the POI, entrance/exit data, over street walkways, underpasses, tunnels, or the like).

As shown at block 1212 of FIG. 12, the apparatus 20 may include means, such as a map module 29, processor 22, or the like, configured to overlay the POI boundary data on the map data. The processor 22 may overlay the POI boundary data on the location associated with the POI on the map data so that the boundary data is in the associated geographical position on the map data. For example, in an instance in which boundary data is associated with the Chicago Union Station, the boundary data may be overlaid on the map data based on the location data associated with the Chicago Union Station.

As shown at block 1214 of FIG. 12, the apparatus 20 may include means, such as a map module 29, a processor 22, or the like, configured to highlight the POI boundary data. The processor may assign a different or brighter color than surrounding map data to the POI boundary data polygonal lines. Additionally or alternatively, the processor 22 may fill the POI boundary data polygonal lines with a solid or translucent color to indicate the highlighted area, or utilize another method of highlighting the POI boundary data.

As shown at block 1216 of FIG. 12, the apparatus 20 may include means, such as a map module 29, a processor 22, a user interface 28, or the like, configured to cause the map data with POI boundary data overlay to be displayed on a user interface 24. The processor 22 may case the map data with POI boundary data overlay to be displayed on the user interface 28. A user may view and/or manipulate the map data with POI boundary data overlay rendering, e.g. move the viewable area of the map to the right or left, zoom in or out, or the like. In an instance in which the user zooms in or out on the map data with POI boundary data overlay, the process may continue at block 1218.

As shown in block 1218 of FIG. 12, the apparatus 20 may include means such as a map module 29, processor 22, user interface, or the like, configured to receive a resolution change indication. The user may zoom in or out on the map data with POI boundary data overlay using the user interface 28. The processor 22 may receive the resolution change indication from the user interface 28, based on the amount of zoom. The processor 22 may receive a change of resolution indication such as, zoom in/increase resolution, or zoom out/decrease resolution. The process may continue at block 1210, performance of resolution analysis. The performance of resolution analysis may be further based on the resolution change indication.

The example embodiments provide clear location identification on a map rendering. The boundary data depicts the location of the building associated with the POI, entrances, and shape. Further, in example embodiments, single builds or portions of buildings associated with the point of interest may be identified in a building complex or similar building arrangement.

As described above, FIGS. 11 and 12 illustrate flowcharts of an apparatus 20, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of block 1202, 1204, 1210, 1214, and 1218 in FIG. 12. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving a point of interest selection indication;
   receiving point of interest boundary data and map data associated with the selected point of interest from a memory, wherein the point of interest boundary data is based on the physical shape of the structure or region associated with the point of interest and defines geographical boundaries of the structure or region for the point of interest;
   performing a map resolution analysis;
   overlaying, using a processor, point of interest boundary data on the map data in response to the map resolution analysis wherein the point of interest boundary overlaid on the map data is of a first shape in response to the map resolution analysis determining a first map resolution, and the point of interest boundary overlaid on the map data is of a second shape, different from the first shape, in response to the map resolution analysis determining a second map resolution, different from the first map resolution; and
   causing the map data with point of interest boundary data overlay to be displayed on a user interface.

2. The method of claim 1 comprising:
   generating a point of interest boundary data, based on the physical shape of a structure or region associated with the point of interest;
   associating the point of interest boundary data with point of interest context data and a map data location; and
   causing the point of interest boundary data to be stored in a memory.

3. The method of claim 1 further comprising:
   receiving a point of interest query indication; and
   generating a point of interest query response list.

4. The method of claim 1 further comprising:
   receiving a resolution change indication; and
   wherein the resolution analysis is further based on the resolution change indication.

5. The method of claim 1 further comprising:
   highlighting the point of interest boundary data overlaid on the map data.

6. The method of claim 1, wherein the point of interest boundary data comprises entrance data.

7. An apparatus comprising at least one processor and at least one memory including computer program code, the at least one memory and computer program code configured to, with the processor, cause the apparatus to at least:
   receive a point of interest selection indication;
   receive point of interest boundary data and map data associated with the selected point of interest from a memory, wherein the point of interest boundary data is based on the physical shape of the structure or region associated with the point of interest and defines geographical boundaries of the structure or region for the point of interest;
   perform a map resolution analysis;
   overlay point of interest boundary data on the map data in response to the map resolution analysis wherein the point of interest boundary overlaid on the map data is of a first shape in response to the map resolution analysis determining a first map resolution, and the point of interest boundary overlaid on the map data is of a second shape, different from the first shape, in response to the map resolution analysis determining a second map resolution, different from the first map resolution; and
   cause the map data with point of interest boundary data overlay to be displayed on a user interface.

8. The apparatus of claim 7, wherein the at least one memory and the computer program code are further configured to:
   generate a point of interest boundary data, based on the physical shape of a structure or region associated with the point of interest;

associate the point of interest boundary data with point of interest context data and a map data location; and cause the point of interest boundary data to be stored in a memory.

9. The apparatus of claim 7, wherein the at least one memory and the computer program code are further configured to:

receive a point of interest query indication; and generate a point of interest query response list.

10. The apparatus of claim 7, wherein the at least one memory and the computer program code are further configured to:

receive a resolution change indication; and wherein the resolution analysis is further based on the resolution change indication.

11. The apparatus of claim 7, wherein the at least one memory and the computer program code are further configured to:

highlight the point of interest boundary data overlaid on the map data.

12. The apparatus of claim 7, wherein the point of interest boundary data comprises entrance data.

13. A computer program product comprising at least one non-transitory computer-readable storage medium having computer-executable program portions stored therein, the computer-executable program code portions comprising program code instructions configured to:

receive a point of interest selection indication;

receive point of interest boundary data and map data associated with the selected point of interest from a memory, wherein the point of interest boundary data is based on the physical shape of the structure or region associated with the point of interest and defines geographical boundaries of the structure or region for the point of interest;

perform a map resolution analysis;

overlay point of interest boundary data on the map data in response to the map resolution analysis wherein the point of interest boundary overlaid on the map data is of a first shape in response to the map resolution analysis determining a first map resolution, and the point of interest boundary overlaid on the map data is of a second shape, different from the first shape, in response to the map resolution analysis determining a second map resolution, different from the first map resolution; and cause the map data with point of interest boundary data overlay to be displayed on a user interface.

14. The computer program product of claim 13, wherein the computer-executable program code portions further comprise program code instructions configured to:

generate a point of interest boundary data, based on the physical shape of a structure or region associated with the point of interest;

associate the point of interest boundary data with point of interest context data and a map data location; and cause the point of interest boundary data to be stored in a memory.

15. The computer program product of claim 13, wherein the computer-executable program code portions further comprise program code instructions configured to:

receive a point of interest query indication; and generate a point of interest query response list.

16. The computer program product of claim 13, wherein the computer-executable program code portions further comprise program code instructions configured to:

receive a resolution change indication; and wherein the resolution analysis is further based on the resolution change indication.

17. The computer program product of claim 13, wherein the computer-executable program code portions further comprise program code instructions configured to:

highlight the point of interest boundary data overlaid on the map data.

* * * * *